United States Patent Office
3,039,267
Patented June 19, 1962

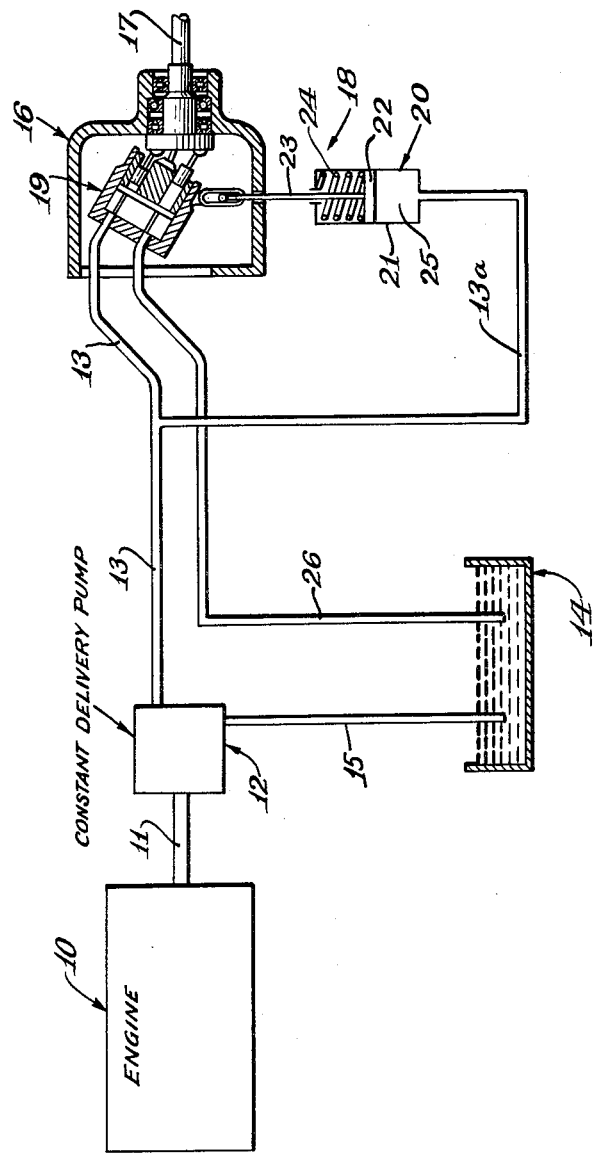

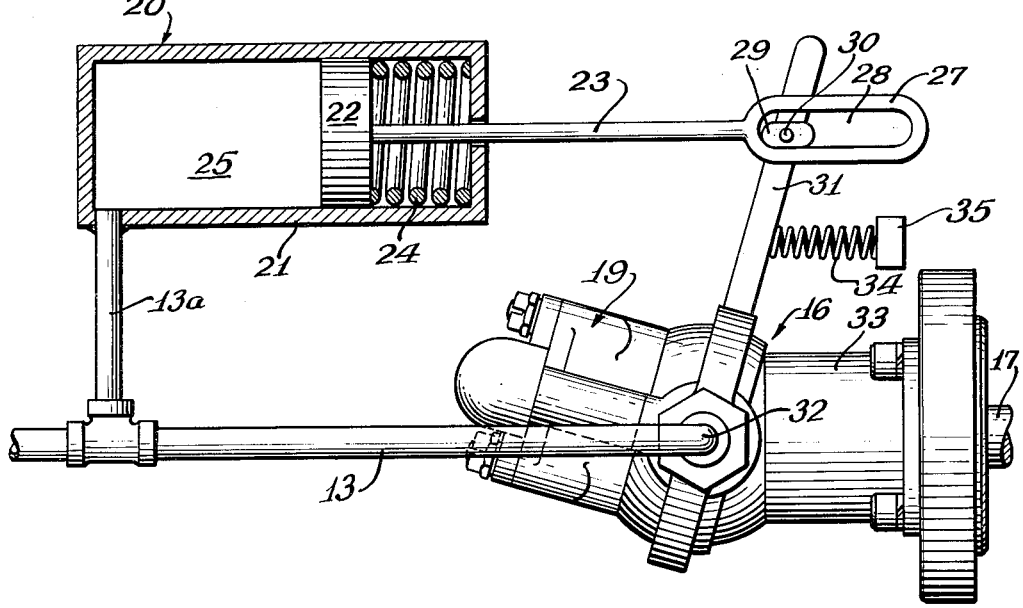
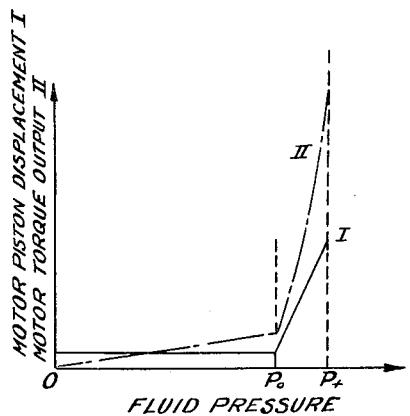
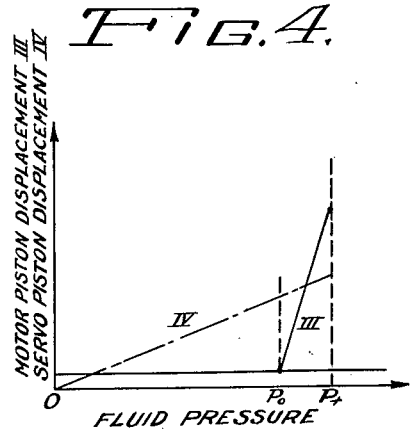

3,039,267
HYDROSTATIC TRANSMISSION SERVO-MECHANISM
Claude Voreaux, Saint-Cloud, and Jean-Pierre Joyeux, Saint-Dizier, Haute-Marne, France, assignors to International Harvester Company, a corporation of New Jersey
Filed Apr. 15, 1960, Ser. No. 22,605
Claims priority, application France Apr. 22, 1959
2 Claims. (Cl. 60—53)

This invention relates to a servo-mechanism for automatic selection of output speed of a variable displacement fluid motor in accordance with the torque requirements imposed by the load on said motor. More in particular this invention relates to a servo-mechanism for automatically varying the output speed of a variable displacement fluid motor in accordance with the variation in output torque requirements of the motor whereby the power input to the motor is maintained substantially constant.

In a hydrostatic driven vehicle, such as an agricultural tractor, the torque requirements of the ground engaging wheels will vary quite widely. For example when the tractor is moving along a level paved road the torque requirements are fairly constant. On the other hand when the tractor is used for plowing and the like the torque requirements will vary quite widely as the operation progresses over the ground due to earth conditions, obstructions, hills and the like. It is well known that internal combustion engines used as power plants in a tractor have a characteristic whereby the engine will deliver its maximum power output at a definite or critical speed. Thus if the engine is operated above or below its critical speed, the power output delivered by the engine is lower than that at its critical speed. From this it can be seen that if the engine is constantly loaded equal to its maximum power output at its critical speed and the engine throttle control is fixed for this operating condition the maximum power output is delivered constantly.

Now in order to maintain this constant load on the tractor's power plant under varying torque requirements of the ground engaging wheels some means for automatically varying the movement speed of the tractor to compensate automatically for variations in the torque load applied must be provided and the prime object of this invention is to provide a servo-mechanism which will accomplish this result.

Another important object of this invention is to provide a servo-mechanism for increasing the displacement of a variable displacement fluid motor automatically as the output load on the motor is increased.

A further important object of this invention is to provide a servo-mechanism for decreasing the displacement of a variable displacement fluid motor automatically as the output load on the motor is decreased.

A still further object of this invention is to provide a servo-motor mechanism actuated by the fluid under pressure energizing a variable piston displacement fluid motor whereby the servo-mechanism increases the piston displacement of the motor responsive to increase of the fluid pressure energizing the motor.

These and other desirable and important objects inherent in and encompassed by the invention will be more readily understood from the ensuing description of a preferred embodiment, the appended claims and the annexed drawings wherein:

FIGURE 1 illustrates schematically the hydraulic circuit with the servo-mechanism of this invention.

FIGURE 2 illustrates, partly in section, the construction of the servo-mechanism of this invention adapted for actuating the means for changing the piston displacement of a variable displacement piston fluid motor.

FIGURE 3 illustrates graphically the characteristics of the piston displacement of the fluid motor in relation to increasing torque requirements imposed by the load applied to the motor.

FIGURE 4 illustrates graphically the piston displacement of the servo-mechanism in relation to the piston displacement of the fluid motor.

Referring now to FIGURE 1 of the drawings the numeral 10 indicates a conventional power plant such as an internal combustion engine of a tractor or other vehicle. The power plant 10 has its rotatable output drive shaft 11 connected to a conventional constant delivery fluid pump indicated at 12 in drive relation. Of course the pump 12 may, if desired, be of the conventional variable output type. The pump 12 discharges hydraulic fluid under pressure in to the conduit 13 and draws fluid from the sump or reservoir 14 through the conduit 15 in a conventional manner. The source of fluid under pressure from the pump 12 through the conduit 13 is communicatively connected to the inlet port of a variable piston stroke fluid motor of conventional construction, generally indicated at 16, having a rotatable output shaft 17, the shaft 17 being connected in drive relation to a variable load such as the ground engaging wheels of a tractor. The fluid motor 16 is of the conventional type of which numerous kinds are known. For example the fluid pressure energy translating device shown in U.S. Patent No. 2,487,617 to R. L. Tweedale may be employed as the variable displacement fluid motor 16 component of this invention.

As stated above the variable displacement fluid motor 16 is one component of the invention and a servo-mechanism 18 actuates movement of the yoke 19 for altering the piston stroke of the fluid motor 16. Thus the greater the angular displacement between the axis of the yoke 19 and the axis of the shaft 17 the greater the stroke or piston displacement of the fluid motor 16, a conventional characteristic of such type unit. From this it can be seen that if the fluid delivery in conduit 13 remains at a constant value, the greater the angular displacement of the yoke 19 with respect to the shaft 17 results in increased torque output of shaft 17 but at a correspondingly lower speed. Conversely, if the angular displacement of the yoke 19 with respect to the shaft 17 decreases, the speed of the shaft 17 increases with a corresponding decrease in torque output. It is the crux of this invention to control or adjust automatically responsive to fluid pressure the angular relation of the yoke 19 with respect to the shaft 17 of the fluid motor 16 (piston stroke or fluid displacement) by means of the servo-mechanism 18.

The servo-mechanism 18 includes a fluid operated ram 20 comprising a casing 21 having a reciprocable piston 22 slidably disposed therein. The piston 22 is provided with an externally projecting connecting rod or work member 23. Disposed on one side of the piston 22 within the casing 21 is a calibrated compression spring 24 which urges the piston 22 and associated connecting rod 23 in a retractive direction.

Connected communicatively to the chamber 25 of the ram 20 is fluid conduit 13a which is a branch conduit communicatively connected to the discharge conduit 13 of the pump 12. The conduit 26 is a return means communicating the discharge side of the fluid motor 16 to the sump 14.

On the outer end portion of the connecting rod 23 is lost motion link 27 provided with an elongated hole 28 as best seen in FIGURE 2. Slidably disposed within the elongated hole 28 is a carrier element 29 pivotally connected at 30 to the control arm 31 of the fluid motor 16. The control arm 31 is rigidly connected to the yoke 19 of the fluid motor 16, the yoke 19 being angularly movable about the axis 32 with respect to the stationary housing 33 of the motor 16. From this it is apparent that when ram 20 is energized the piston 22 advances expansively until the inner end portion of the lost motion link 27 engages the carrier element 29. Up until this point the control arm 31 is not actuated. Now as the piston 22 advances further the control arm 31 is moved in a direction to increase the angular displacement of the longitudinal axis yoke 19 with respect to the longitudinal axis of the shaft 17. This movement increases the fluid displacement by increasing the length of the stroke of the pistons in the fluid motor 16. When the ram 20 is de-energized the compression spring 24 urges the piston 22 retractively thus allowing the control arm 31 to return the yoke 19 to the position of minimum angular displacement corresponding to maximum speed and minimum torque output of shaft 17. At zero angular displacement the pistons of the fluid motor 16 do not move (zero stroke) and of course no fluid flow therethrough exists. The small compression spring 34 is anchored to a stationary block 35 and positioned to urge the control arm 31 in a direction toward minimum piston stroke of the fluid motor 16. The characteristics of spring 34 need only be sufficient to shift the control arm 31 without assistance from the ram 20. Thus spring 34 has negligible effect on the pressure of fluid in chamber 25 required to actuate ram 20.

In operation with no load on shaft 17 the engine 10 may be set at any desired speed such as, for example, its critical speed wherein it delivers it maximum power. Fluid pressure in the conduit 13 pressurizes the chamber 25 of the ram 20 as well as the fluid motor 16 thus energizing rotational movement of the shaft 17. The shaft 17 now rotates at its maximum noload speed and the pressure of the fluid in conduit 13 is low because the fluid flows with but low resistance through the motor 16 to the return conduit 26. Under such condition the servo piston 22 of the ram 20 does not move because of insufficient fluid pressure in the chamber 25.

Now if a load is applied to the shaft 17 there is an increase in the resistance to flow of fluid through the motor 16, thus increasing the pressure in the conduit 13 and chamber 25. This increase in pressure in the chamber 25 begins to move the servo-piston 22 expansively to overcome the calibrated spring 24. When the load or torque output requirement is increased to a predetermined value whereby the fluid pressure in the chamber 25 is increased to a value $Po$ (FIGURES 3 and 4) the link 27 becomes in engaged position with the carrier element 29. At this load on the shaft 17 the speed of the shaft 17 will be reduced corresponding to the increased torque required on the shaft 17 by the load applied.

When the load on shaft 17 is further increased beyond the corresponding fluid pressure $Po$ in the chamber 25, the ram 20 commences to actuate the control arm 31 for correspondingly increasing the fluid displacement (piston stroke) of the motor 16. As the load on shaft 17 is further increased the expansive movement of the ram 20 is correspondingly increased thus correspondingly increasing the piston stroke of the motor 16. When the load on shaft 17 has increased to a corresponding pressure $Pt$ (FIGURES 3 and 4) the ram 20 has expanded to its limit and thus the piston stroke displacement of the motor 16 has reached its maximum limit. Pressures above $Pt$ represent an overload of the motor 16 beyond its rated capacity.

A reduction in load on the shaft 17 immediately reduces the resistance of fluid flow through the motor 16 and thus correspondingly reduces the fluid pressure in conduits 13 and 13a and in chamber 25 which then permits the spring 24 to move the piston 22 retractively thereby correspondingly reducing the piston stroke displacement of the motor 16 at the urging of the spring 34.

From the above it can be seen that by proper selection of the compressive characteristics of calibrated spring 24 commensurate with the maximum and minimum torque requirements on the shaft 17 the fluid pressure in the conduits 13, 13a and chamber 25 will always be at a value between $Po$ and $Pt$. The pressure differential $Po$ to $Pt$ is thus limited by the characteristics of the ram 20 and the calibrated spring 24 therein.

Thus it is readily apparent that the servo-mechanism for controlling automatically the fluid displacement of a variable displacement fluid motor provides a means for maintaining the fluid displacement of the motor at its minimum piston stroke for all fluid pressure values not exceeding a predetermined value $Po$ (which may be zero) and increasing correspondingly the fluid displacement of the fluid motor by increasing its piston stroke when the pressure exceeds $Po$ until the fluid pressure reaches a value $Pt$ corresponding to maximum piston stroke of the fluid motor. Since the power output of the shaft 17 is a function of torque multiplied by the speed it can be seen that when torque requirements are elevated the speed correspondingly is reduced. Thus, if the characteristics of the ram 20 including spring 24 are properly selected commensurate with the minimum and maximum torque requirements of shaft 17, the power requirements of the engine 10 are always within the limits necessary to attain fluid pressures between the range of $Po$ and $Pt$. However, of course, if the predetermined value of pressure is positive and the torque requirement decreases below the value necessary to maintain the pressure value of $Po$ then the shaft 17 merely increases its speed correspondingly.

It can thus be seen that in the absence of a resisting torque on the shaft 17, the fluid motor is at minimum piston stroke. When a resisting torque is set up on the shaft 17 (load) the pressure in conduit 13 increases until it reaches the value necessary to meet the resisting torque (FIGURE 3), the governing speed of shaft 17 being then determined by the altered piston stroke of the motor 16, the pump 12 delivery being constant. The elongated hole 28 of the link 27 permits, when the fluid pressure is below $Po$, a slight time delay before actuating the control arm 31. This provides a limited amount of compression of the spring 24 prior to actuating engagement of the link 27 for moving the control arm 31.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. An automatic hydrostatic transmission device comprising in combination a variable stroke piston fluid motor having a rotary power output shaft, said motor having a movable control arm for adjusting the piston stroke of said motor, a spring operatively positioned to urge said control arm in a direction for decreasing the piston stroke of said motor, an hydraulically actuated servo-mechanism, said servo-mechanism comprising a one-way acting hydraulic ram having a movable servo-piston and an externally projecting work member secured thereto, a compressive spring disposed in said ram positioned to urge said servo-piston and work member retractively, a lost motion link secured to the projecting portion of said work member, said link having an elongated hole therethrough, said elongated hole having its major axis positioned in parallel relation with respect to the axis of said work member, a carrier element disposed slidably in said hole, said carrier member being pivotally connected to said control arm thereby permitting a time delay between initial movement of said work member and actuation of said control arm, said ram being positioned for advancing said work member and control arm in a direction to increase the piston stroke of said motor, a pump constituting a source of constant delivery fluid under pressure communicatively connected to energize said motor and said ram, said servo-mechanism being operative to actuate said control arm for increasing the piston stroke of said motor responsive to increased fluid pressure resulting from increased resistance of fluid flow through said motor whereby the torque delivered to said output shaft automatically governs the speed of said shaft and piston stroke of said motor.

2. An automatic hydrostatic transmission device comprising in combination a variable stroke piston fluid motor having a rotary power output shaft, said motor having control means for adjusting the piston stroke of said motor, resilient means operatively positioned to urge said control means in a direction for decreasing the piston stroke of said motor, an hydraulically actuated servo-mechanism, said servo-mechanism comprising a one-way acting hydraulic ram having a movable servo-piston and an externally projecting work member secured thereto, compressive resilient means disposed in said ram positioned to urge said servo-piston and work member retractively, a lost motion link secured to the projecting portion of said work member, said link having an elongated hole therethrough, a carrier element disposed slidably in said hole, said carrier element in said hole being movable in a direction substantially parallel to the longitudinal axis of said work member and operably connected to said control means thereby permitting a time delay between initial movement of said work member and actuation of said control means, said ram being positioned for advancing said work member and control means in a direction to increase the piston stroke of said motor, a source of constant delivery fluid under pressure communicatively connected to energize said motor and said ram, said servo-mechanism being operative to actuate said control means for increasing the piston stroke of said motor responsive to increased fluid pressure resulting from increased resistance to fliud flow through said motor whereby the torque delivered to said output shaft automatically governs the speed of said shaft and piston stroke of said motor.

References Cited in the file of this patent

UNITED STATES PATENTS

| | | |
|---|---|---|
| 1,424,823 | Ingoldby | Aug. 8, 1922 |
| 1,877,091 | Vickers | Sept. 13, 1932 |
| 2,161,439 | Thoma | June 6, 1939 |
| 2,285,069 | Vickers | June 2, 1942 |
| 2,382,437 | Molly | Aug. 14, 1945 |
| 2,487,617 | Tweedale | Nov. 8, 1949 |
| 2,671,632 | Palmer | Mar. 9, 1954 |